(12) United States Patent
Giacobbe et al.

(10) Patent No.: US 7,194,516 B2
(45) Date of Patent: Mar. 20, 2007

(54) ACCESSING DIFFERENT TYPES OF ELECTRONIC MESSAGES THROUGH A COMMON MESSAGING INTERFACE

(75) Inventors: Gail Borod Giacobbe, Seattle, WA (US); Bryan T. Starbuck, Redmond, WA (US); Randy Knight Winjum, Vashon, WA (US); John Heinrich Lueders, Seattle, WA (US); Alexander E. Vaschillo, Redmond, WA (US); Stephen T. Wells, Seattle, WA (US); Robert C. Combs, Redmond, WA (US); Sridhar Sundararaman, Bellevue, WA (US); Raghavendra Rachamadugu, Hyderabad (IN); Hubert Louis Marie Van Hoof, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 10/692,201

(22) Filed: Oct. 23, 2003

(65) Prior Publication Data
US 2005/0138002 A1    Jun. 23, 2005

(51) Int. Cl.
G06F 15/16 (2006.01)
(52) U.S. Cl. ............... 709/206; 709/217; 709/250; 707/3; 379/88.13
(58) Field of Classification Search ............. 709/206, 709/217, 250, 246, 223; 707/3; 379/88.13
See application file for complete search history.

(56) References Cited

U.S. PATENT DOCUMENTS

| | | | |
|---|---|---|---|
| 6,430,174 B1* | 8/2002 | Jennings et al. | 370/352 |
| 6,430,177 B1* | 8/2002 | Luzeski et al. | 370/356 |
| 6,487,278 B1* | 11/2002 | Skladman et al. | 379/88.13 |
| 6,493,703 B1 | 12/2002 | Knight et al. | 707/3 |
| 6,778,642 B1* | 8/2004 | Schmidt et al. | 379/88.13 |
| 6,990,513 B2* | 1/2006 | Belfiore et al. | 709/206 |
| 2003/0018644 A1 | 1/2003 | Bala et al. | 707/100 |
| 2003/0018721 A1* | 1/2003 | Gupta et al. | 709/206 |
| 2004/0203664 A1* | 10/2004 | Lei et al. | 455/414.1 |
| 2004/0237042 A1 | 11/2004 | Murray et al. | 715/530 |
| 2005/0060317 A1 | 3/2005 | Lott et al. | 707/10 |

OTHER PUBLICATIONS

Achieving Service Portability Using Self-Adaptive Data Paths Zhuoqing, M.M. Katz, R. California University, Berkeley, C.A. Jan. 2002.

University Inboz: Providing Extensible Personal Mobility And Service Mobility In An Integrated Communication Network Raman, B. Katz, R.H. Joseph, A.D. Div. of Comput. Sci., California University, Berkeley, C.A. 2000.

* cited by examiner

*Primary Examiner*—Philip B. Tran
(74) *Attorney, Agent, or Firm*—Workman Nydegger

(57) ABSTRACT

The present invention extends to methods, systems, computer program products, and data structures for presenting different types of electronic messages at a common interface. Electronic message items are stored in an item database along with other types of items, such as, for example, contact items, folder items, document items, etc. Electronic message items have some common defined data fields and possibly other differently defined data fields that represent protocol and/or application specific properties. Computer systems can query the item database for message related data (e.g., from commonly defined data fields) and display links to message related data at a common messaging interface. Links to different types of electronic messages (as represented by protocol and/or application specific properties) may be displayed simultaneously at the common messaging interface.

32 Claims, 7 Drawing Sheets

ACCESSING DIFFERENT TYPES OF ELECTRONIC MESSAGES THROUGH A COMMON MESSAGING INTERFACE

BACKGROUND OF THE INVENTION

1. The Field of the Invention

The present invention relates to electronic messaging and, more particularly, to accessing different types of electronic messages through a common messaging interface.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.,) to exchange information with one another. For example, to create an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropriate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

Computer system users can also use other different messaging applications to send, receive, and store other different types of electronic messages. Unfortunately, different types of electronic messages (e.g., electronic mail messages, instant messages, faxes, blog entries, voice messages, etc.) are typically stored in different data formats. For example, a data format used to store one type of electronic message, such as, for example, an instant message, typically differs from the data format used to store other different types of electronic message, such as, for example, a news group posting. Thus, to access a specified type of electronic message, a user is required to use a messaging application that can access data stored in the data format corresponding to the specified type of electronic message. For example, a user is typically required to use an instant messaging application to access instant messages.

Further, messaging applications are typically configured to access only a few, or even only one, type of electronic message and cannot generally be used to access other additional types of electronic messages. That is, messaging applications are typically designed to access data stored in a limited number of data formats, and potentially only one data format, that corresponds to one or more specified electronic message types. For example, an instant message application is typically configured to access data stored in one or more instant message data formats but is typically not configured to access data stored in fax data formats.

Additionally, some data formats can be application specific. Thus, two messaging applications configured to access the same type of electronic messages may nonetheless use different data formats to store electronic message data. For example, a first electronic mail application may store electronic mail messages using a first data format, while a second electronic mail application stores electronic mail messages using a second different data format. Thus, a messaging application developed to access electronic messages of a particular type may not be able to access all electronic messages of the particular type. For example, an electronic mail message stored in the first data format by the first electronic mail application may not be accessible to the second electronic mail application (e.g., that can only access electronic mail messages stored in the second data format).

Also, each different messaging application typically stores corresponding electronic messages in a different database. For example, an instant messaging application can store instant messages in an instant messaging database, an electronic mail application can store electronic mail messages in an instant messaging database, a news group reader can store news group postings in a news group database, etc.

Accordingly, most, if not all, computer systems include a number of messaging applications for storing and accessing message data stored in different data formats and residing in different databases. For example, a computer system can include an electronic mail application for accessing electronic mail messages, an instant message application for accessing instant message, a fax application for accessing faxes, etc. Using multiple electronic messaging applications can be time consuming, for example, when a user desires to access all available electronic messages corresponding to a specified entity. If the desired electronic messages are stored in different data formats and/or reside in different databases, each messaging application will have to perform a separate search for desired electronic messages. For example, the user may be required to switch to an electronic mail application (or even switch between multiple electronic mail applications) to search for electronic mail messages, switch to an instant message application to search for instant messages, and switch to a voice message application to search for voice messages. Having multiple messaging applications perform searches for electronic messages potentially results in an undesirable expenditure of time and computer system resources.

Searches and queries for specific electronic messages or electronic message related data must also be performed separately at each of the electronic messaging applications.

That is, a user would be required to use an electronic mail application to search for electronic mail messages. However, the user typically could not use the electronic mail application to search for stored instant messages or voice messages. Having to perform separate searches at each messaging application can be particularly problematic when the electronic message type is unknown. The user may be required to execute searches in each of a number of different messaging applications to locate a single electronic message. Therefore systems, methods, computer program products, and data structures for accessing different types of electronic messages through a common messaging interface would be advantageous.

BRIEF SUMMARY OF THE INVENTION

The foregoing problems with the prior state of the art are overcome by the principles of the present invention, which are directed towards methods, systems, computer program products, and data structures for accessing different types of electronic messages through a common messaging interface. Generally, electronic messages are created in accordance with an electronic message schema hierarchy. Electronic messages can be created such that some data fields are commonly defined (e.g., a subject field, a participants field, an importance field, etc.) even between different types of electronic messages (e.g., between electronic mail messages and instant messages). Electronic messages can also be created such that some data fields, for example, data fields specific to particular message protocols and/or particular message applications are separately defined (e.g., a PosterID for a news group posting and deleted field for an electronic mail message) and can thus differ between different types of messages. Accordingly, an electronic message can have some fields in common with other electronic messages and some fields that differ from other electronic messages. Having some commonly defined fields and other differently defined fields allows electronic messages to be displayed at a common messaging interface and also have protocol and/or application specific properties.

Electronic message items (having some commonly defined and possibly other (differently defined data fields) are stored in an item database along with other types of items, such as, for example, contact items, folder items, document items, etc. Computer systems can query the item database for message related data and display query results at a common messaging interface. A querying computer system receives query criteria (e.g., a request for all electronic messages from "User A", a request for all electronic messages received before Apr. 27, 2003, etc.) for a message related query. Query criteria can be received at the common messaging interface, for example, as a result of user-input. The querying computer system submits a message related query to the item database in accordance with the query criteria.

A returning computer system receives the message related query from the querying computer system. The returning computer system accesses the item database and identifies one or more portions of message related data that satisfy the query criteria. Identifying message related data can include searching values of commonly defined data fields. Commonly defined fields can be searched even for message items that also have a number of different protocol and/or application specific data fields. Accordingly, it may be that a number of different types of electronic messages (as represented by protocol and/or application specific data fields) are identified. For example, all messages received before Mar. 21, 2002 may include electronic mail messages, instant messages, fax messages, voice messages, etc.

The returning computer system returns the one or more portions of message related data to the querying computer system. The querying computer system receives the one or more portions of message related data. The querying computer system configures the message related interface such that at least a link to each of the portions of message related data can be accessed. Thus, when message items representing different types of electronic messages are received, links to the different types of electronic messages may be displayed simultaneously at the common messaging interface. A user can select a corresponding link to access a particular electronic message.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
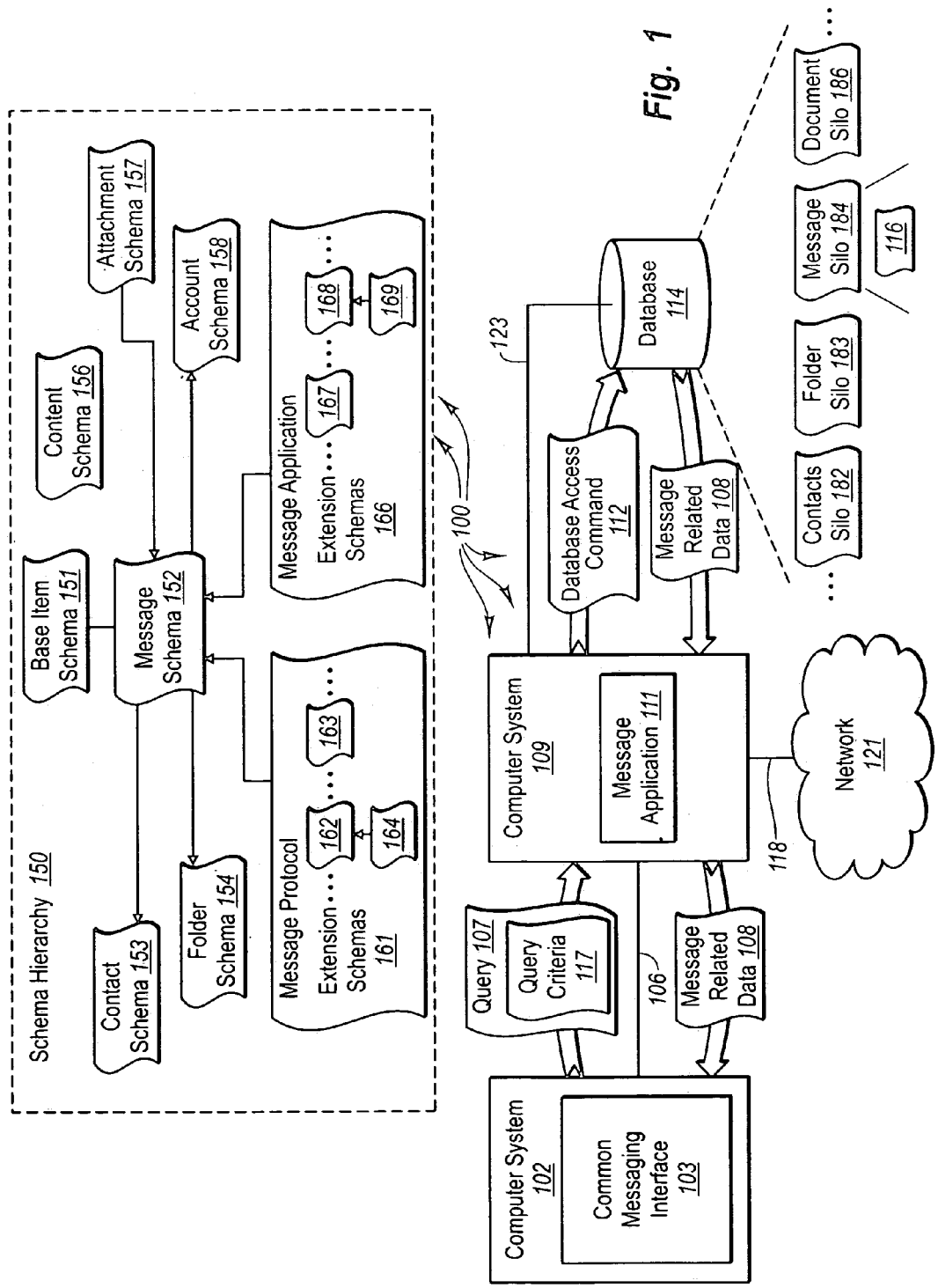
FIG. 1 illustrates an example of a network architecture and general schema hierarchy that facilitate accessing different types of electronic messages through a common messaging interface in accordance with the principles of the presenting invention.

The principles of the present invention provide for accessing different types of electronic messages through a common messaging interface. Electronic message items are stored in an item database along with other types of items, such as, for example, contact items, folder items, document items, etc. Electronic message items have some common defined data fields and possibly other differently defined data fields that represent protocol and/or application specific properties. Computer systems can query the item database for message related data (e.g., from commonly defined data fields) and display links to message related data at a common messaging interface. Links to the different types of electronic messages (as represented by protocol and/or application specific properties) may be displayed simultaneously at the common messaging interface.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actually file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc., A schema a can also be defined to reference or link to other if schemas in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a network architecture 100 and general schema hierarchy 150 that facilitate efficiently storing and accessing electronic message related data in accordance with the principles of the present invention. Network architecture 100 includes computer system 102, computer system 109, database 114, and network 121. Computer system 102 and computer system 109 are connected by corresponding link 106. Computer system 102 and computer system 109 can exchange message related data (e.g., electronic mail messages, instant messages, fax messages, news group postings, voice messages, message attachments, etc.) over link 106. For example, it may be that computer system 109 is a messaging server that stores electronic messages. From time to time computer system 102 may connect to computer system 109 to download electronic messages.

Computer system 109 is connected to database 114 by link 123. Database 114 can be a database that stores a plurality of different types of database items. For example, contacts silo 183 can store contact items representing contacts (erg., individuals, organizations, corporations, etc.), folder silo 183 can store folder items representing folders that store other types of items (e.g., that store message items), message silo 184 can store message items representing electronic messages, document silo 186 can store document items representing various types of documetns, etc.

Database items stored in database 114 can include data fields defined in accordance with the schemas of schema hierarchy 150. A series of three periods (an ellipsis) before contacts silo 182 and after document silo 186 indicates that other silos (potentially storing other different types database items) can be included in database 114.

Computer system 109 is connected to network 121 by link 118. Network 121 can be a Local Area Network ("LAN"), Wide Area Network ("WAN"), or even the Internet. Computer system 109 can receive data from and send data to other computer systems connected to network 121 over link 118. Computer system 102, computer system 109, and possibly other computer systems connected to network 121 can have access to schemas included in schema hierarchy 150.

Schema hierarchy 150 generally represents data formats for defining electronic messages. Message items representing electronic messages (as well as other types of items in database 114) can be defined in accordance with base item schema 151. Generally, a base item schema can define data formats for data fields (e.g., a globally unique ID and display name) used to differentiate one database item from another database item. Accordingly, message items stored in message silo 184 (as well as items stored contacts silo 182, folder silo 183, and document silo 186) can include one or more data fields defined in accordance with base item schema 151.

Message schema 152 defines data formats for one or more data fields (e.g., message subject, message size, etc.) that are common to a plurality of different types of electronic messages (e.g., electronic mail messages, instant messages, news group postings, blog entries, fax messages, voice mail messages, etc). Message schema 152 can define a common format, such as, for example, a text format or HyperText Markup Language ("HTML") format. Accordingly, message items stored in message silo 184 can include one or more data fields defined in accordance with message schema 152. Message schema 152 can define data fields that refer or linked to data fields defined in accordance with other schemas in schema hierarchy 150.

For example, message schema 152 can define one or more data fields that refer or link to contact related information (having data fields defined in accordance with contact schema 153) in contacts silo 182. Accordingly, a message item defined in accordance with message schema 152 can refer or link to contacts related information in silo 182. Referring to or linking to contact related information can indicate that the entity corresponding to the contact related information is associated with the message item. Similarly, message schema 152 can define one or more data fields that refer or link to a folder related information (having data fields defined in accordance with contact schema 153) in folders silo 183. Accordingly, a message item defined in accordance with message schema 152 can also refer or link to folder related information in folder silo 183. Referring to or linking to a folder related information can indicate that the message item is stored in a folder corresponding to the folder related data.

Likewise, message schema 152 can define one or more data fields that refer to link to document related information. Accordingly, a message item defined in accordance with schema 152 can include one or more attachments (having data fields defined in accordance with attachment schema 157) that refer to link to file related data in document silo 186. Referring to or linking to document related data can indicate that the document corresponding to the document related data is an attachment to the message item. Further, a message item defined in accordance with message schema 152 can refer or link to account related data defined in accordance with account schema 158. The content of a message item (e.g. a message body or message attachment) can include data fields defined in accordance with content schema 156

A message item defined in accordance with schema 152 can also include data fields defined in accordance with one or more message extensions schemas. Some message extension schemas can be protocol extensions that promote compatibility with specified message protocols. Message protocol extension schemas 161 can contain one or more message protocol extension schemas defining data fields that are specific to particular message protocols. For example, protocol extension schema 162 can define data formats for one or more data fields specific to a first message protocol (e.g., Network News Transfer Protocol ("NTTP")) and protocol extension schema 163 can define data formats for one or more data fields specific to a second message protocol (e.g., Post Office Protocol ("POP")). Protocol extension schemas can be arranged hierarchy. For example, protocol extension schema 164 can define data formats for additional data fields specific to a particular implementation of the first message protocol (having data fields defined in accordance with protocol extension schema 162).

Other message extensions can be application extensions that promote compatibility with specified message applications. Message application extension schemas 166 can contain one or more message application extension schemas defining data fields that are specific to message applications. For example, application extension schema 167 can define data formats for one or more data fields specific to a first message application (e.g., an electronic mail application) and application extension protocol schema 168 can define data formats for one or more data fields specific to a second message application (e.g., fax application). Application extension schemas can be arranged hierarchy. For example, application extension schema 169 can define data formats for additional data fields specific to a particular version of the second message application (having data fields defined in accordance with application extension schema 168).

Thus, a message item having data fields defined in accordance with message schema 152 can also have additional data fields defined in accordance with any of the extension schemas in message protocol extension schemas 161 and message application extension schemas 166. Data fields corresponding to message extensions can be "snapped" on to and removed from message items as appropriate to facilitate compatibility with existing message protocols and message applications. Accordingly, the configuration of data fields contained in a message item can change over time.

An application, such as, for example, message application 111 (a database interface module), may request that data fields of a particular protocol extension schema or application extension schema be snapped on to or removed from a message item before accessing the message item. Thus, it may be that a message item is transformed for compatibility with a particular message protocol or message application. For example, message application 111 may request that fields of the NNTP protocol extension schema be snapped onto message item 116. Accordingly, message application 111 can retrieve message item 116 and transform message item 116 to include data fields (e.g., defined in accordance with protocol extension schema 162) that promote compatibly with the NNTP protocol. The transformed message item 116 can then be transferred to computer system 102 or re-stored in database 114.

Figure 2A:
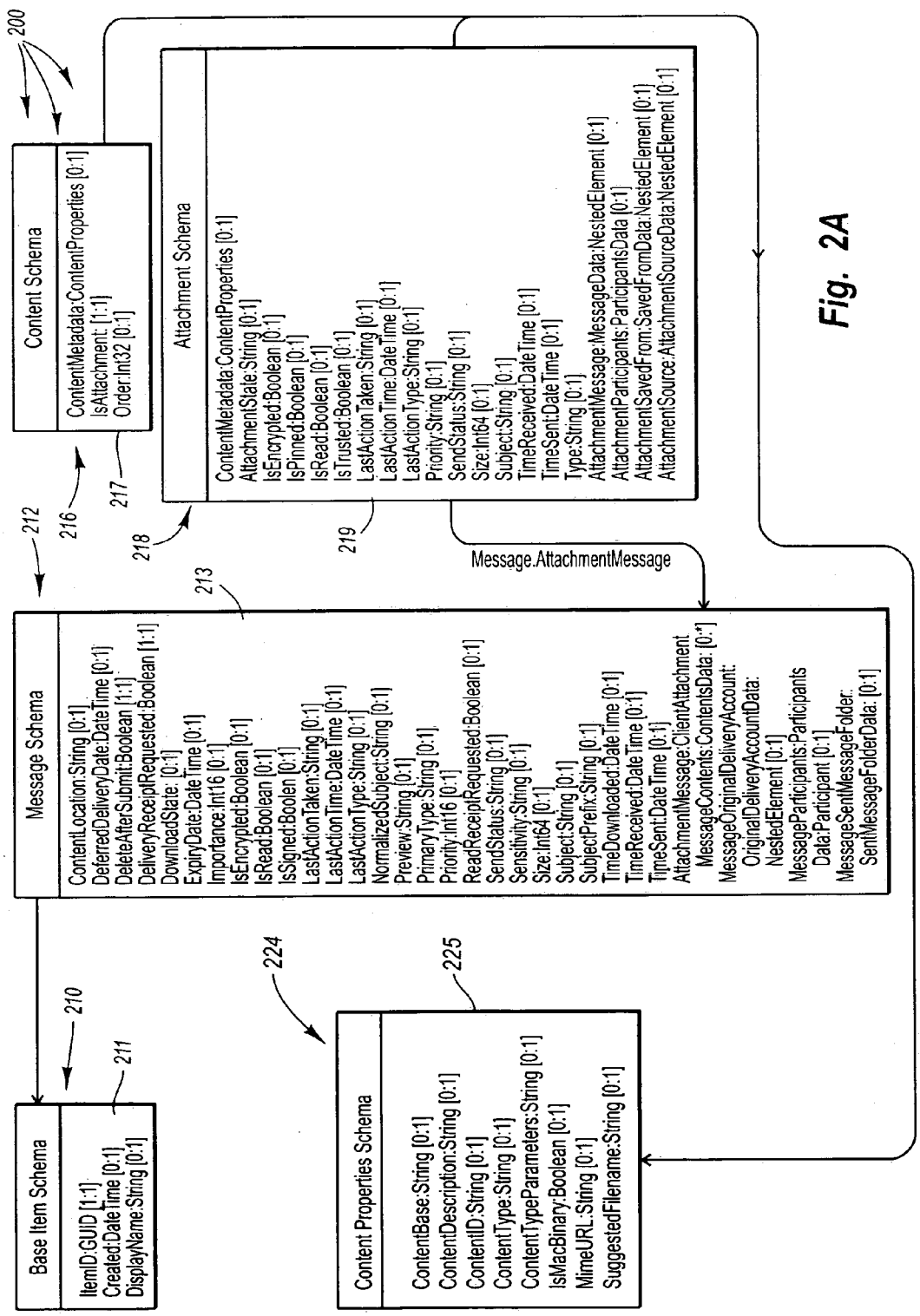
FIG. 2A illustrates a portion of an example of a more detailed schema hierarchy in accordance with the principles of the present invention.
Figure 2B:
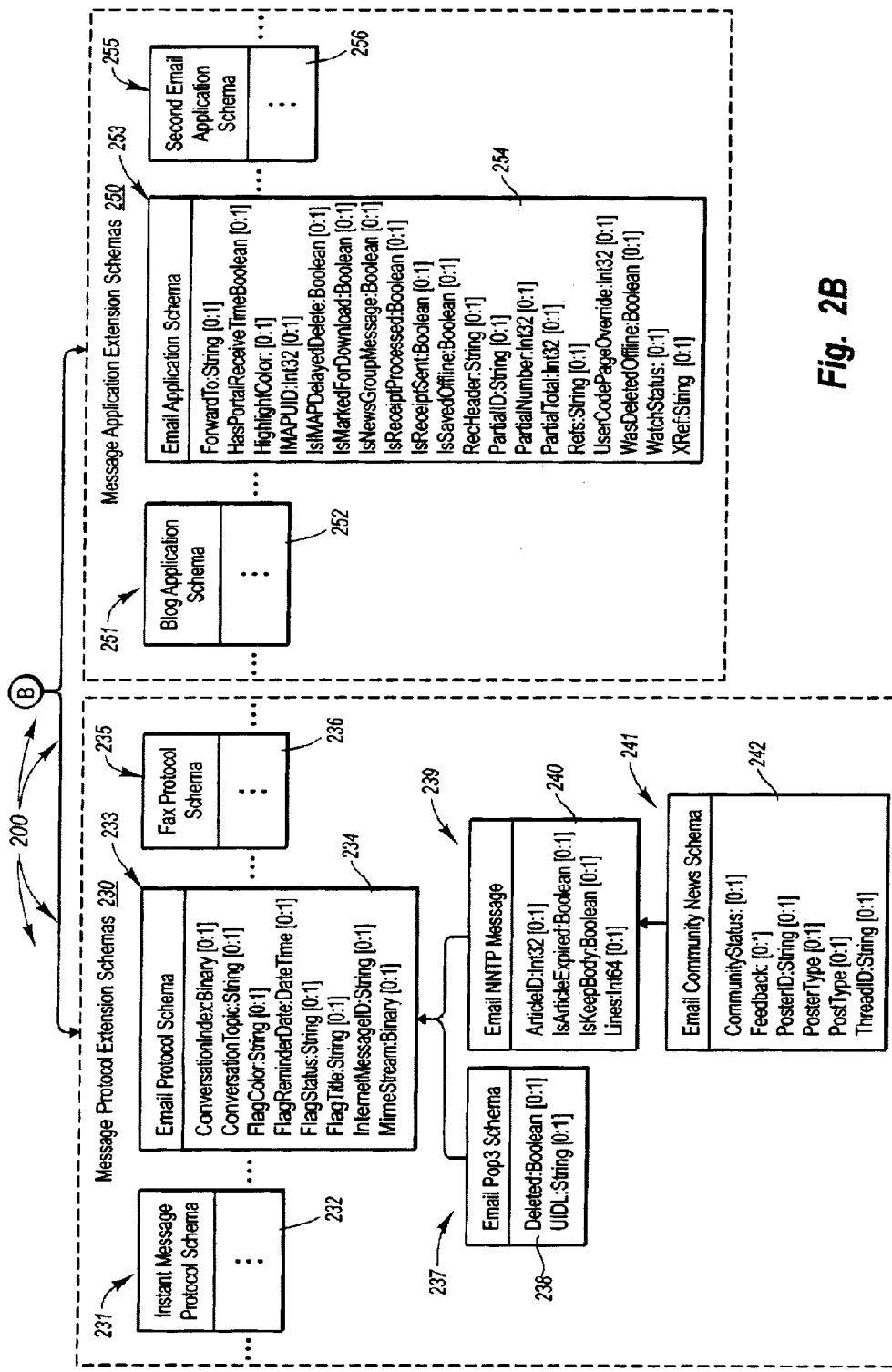
FIG. 2B illustrates a message extension portion of an example of a more detailed schema hierarchy in accordance with the principles of the present invention.

FIGS. 2A and 2B illustrate an example of a more detailed schema hierarchy 200 in accordance with the principles of the present invention. Depicted in FIG. 2A, schema hierarchy 200 includes base item schema 210. Base item schema 210 includes interrelated fields 211 that define data formats for representing base item data. More specifically, interrelated fields 211 can define data formats as described in Table 1.

TABLE 1

| Field Name | Field Data Type | Field Description |
| --- | --- | --- |
| ItemID | GUID | Defines a format for representing a globally unique identifier for a database item. |
| Created | DateTime | Defines a format for indicating the date and time a database item, having a globally unique identifier defined in accordance with the ItemID field, was created. |

TABLE 1-continued

| Field Name | Field Data Type | Field Description |
| --- | --- | --- |
| DisplayName | String | Defines a format for indicating a descriptive name for a database item having a globally unique identifier defined in accordance with the ItemID. |

Depicted in FIG. 2A, schema hierarchy 200 includes message schema 212. Message schema 212 derives from base item schema 210 and also includes interrelated fields 213 that define data formats for representing a message item. The fields of message schema 212 can be applied to a base item having a globally unique identifier (defined in base item schema 210) to cause the base item to exhibit the properties of a message item. More specifically, interrelated fields 213 can define data formats as described in Table 2.

TABLE 2

| Field Name | Field Data Type | Field Description |
| --- | --- | --- |
| ContentLocation | String | Defines a format for representing referenced content from a message's Content-Location header. This field can be used along with the base Content-Location. Some attachments will have relative Content-Locations to this Content-Location. |
| DeferredSendTime | DateTime | Defines a format for representing the date and time when the message is to be delivered. |
| DeleteAfterSubmnit | Booelan | Defines a format for indicating whether the message should be deleted after being submitted for delivery. |
| DownloadState | String | Defines a format for representing the different phases of downloading the message from the server. Partial, etc. |
| ExpiryDate | DateTime | Defines a format for representing the date and time when the content of the message expires. In general, no automatic action is implied. |
| Importance | Int16 | Defines a format for representing the message sender's opinion of the importance of the message. Corresponds with the "Importance:" field in SMTP. Possible values are 1 ("Low"), 2 ("Normal"), and 3 ("High"). The default value for new messages is 2 ("Normal"). |
| IsEncrypted | Boolean | Defines a format for indicating if the message is encrypted. |
| IsRead | Boolean | Defines a format for indicating if the message has been marked as read by the user. |
| IsSigned | Boolean | Defines a format for indicating if the message has been signed. |
| LastActionTaken | String | Defines a format for representing the last action taken on the message. Possible values are: Replied and Forwarded. |
| LastActionTime | DateTime | Defines a format for representing the date and time at which the last action was taken on the message. |
| LastActionType | String | Defines a format for representing the type of last action taken on this message. Should be interpreted together with LastActionTaken. Examples are: Fax or Email to mark that we replied by fax or email. |
| NormalizedSubjet | String | Defines a format for representing the normalized subject of the message. The NormalizedSubject is the part the subject following the prefix. If there is no prefix, NormalizedSubject is the same as the subject. |
| Preview | String | Defines a format for representing a preview of the message. The preview property can contain the first few characters of the main message body, or some representation of it that will be used for previewing the message. This is cache-optimization field. It is calculated form the bodies and is put here for fast retrieval in preview scenarios. It is text only field and is not mandatory. |

TABLE 2-continued

| Field Name | Field Data Type | Field Description |
|---|---|---|
| PrimaryType | String | Defines a format for representing a message type (e.g., Email, FaxMessage, InstantMessage, VoiceMessage, MeetingRequest, etc.) associatd with the message. The message type will imply behavior of the message. Applications can customize icons and read custom headers based on the message type. This value can come from the X-MessageType header. |
| Priority | Int16 | Defines a format for representing a message priority for the message. Message priority for delivery as set by application. Values: AboveNormal = 3, Normal = 2, BelowNormal = 1. Higher values indicate that a transport should deliver it sooner than messages of a lower level. |
| ReadReceiptRequested | Boolean | Defines a format for indicating if read receipt has been requested for this message. |
| SendStatus | String | Defines a format for representing a send status of the message. "ToSend": Compose UI marks this way for transports to pick up. "Sending": A transport transitions from "ToSend" to "Sending" so other transports won't also attempt to send the message. "Sent": The transport transitions from "Sending" to "Sent" after the send is complete. |
| Sensitivity | String | Defines a format indicating the message sender's opinion of the sensitivity of the message. Corresponds with the "Sensitivity:" field in SMTP. Possible values are: None (no special sensitivity), Personal, Private, or Company-Confidential. The default value for new messages is None. |
| Size | Int64 | Defines a format for representing the calculated size of the message in bytes. This includes the entire message with body, header and attachments. The value can be missing if the size is unknown. |
| Subject | String | Defines a format for representing the subject of the message. For example, one line that describes the topic of the message. This field is calculated from NormalizedSubject and SubjectPrefix. Subject of the message. Subject can be computed from the Subject and SubjectPrefix values in the following manner: (1) If SubjectPrefix is present, Subject is set to the contents of the NormalizedSubject with the prefix prepended. (2) If SubjectPrefix is not present, NormalizedSubject is copied to Subject. |
| SubjectPrefix | String | Defines a format for representing a SubjectPrefix of the message. Consists of one or more alphanumeric characters, followed by a colon and a space (which are part of the prefix). The subject prefix may be absent. If SubjectPrefix is set express;y, it can be of any length and use any alphanumeric characters and can match a substring at the beginning of the subject. If SubjectPrefix is not expressly set and must be computed by, its contents can be more restricted. One possible rule for computing the prefix is that the subject begin with one, two, or three letters (alphabetic only) followed by a colon and a space. If such a substring is found at the beginning of the subject, it then becomes SubjectPrefix (and also stays at the beginning of the Subject field). Otherwise SubjectPrefix remains unset. |
| TimeDownloaded | DateTime | Defines a format for representing the date and time the message was downloaded from the server. |
| TimeReceived | DateTime | Defines a format for representing the date and time the message was delivered. The TimeReceived property describes the time the message was received by the server, rather than the time the message was downloaded from the server and placed in the local WinFS store. This value is missing on draft messages and retained copied of send messages. |
| TimeSent | DateTime | Defines a format for representing the date and time the message sender submitted the message. On draft messages this value can be missing - it can be set when the message is submitted. |

TABLE 2-continued

| Field Name | Field Data Type | Field Description |
|---|---|---|
| AttachmentMessage | Attachment | Defines a format for representing a link to attachment data corresponding to the message. The attachment data can be defined in accordance with an attachment schema. |
| MessageContents | ContentsData | Defines a format for representing link to a portion of message content corresponding to the message. The portion of message content can be defined in accordance with a content schema. |
| MessageOriginalDeliveryAccount | OriginalDeliveryAccountData | Defines a format for representing a link to original delivery account data corresponding to the message. The original delivery account data can be defined in accordance with an account schema. |
| Message Participants | ParticipantsData | Defines a format for representing a link to contact data corresponding to the message. Contact data can be defined in accordance with a contact schema. The contact data can represent a collection of users who participated in the message exchange. This includes, senders, receivers, people copied (Cc), etc. A participant is a link to the Contact Item representing message sender/receiver. May be left dangling in which case the fields on this type contain all the necessary data about the participant. |
| MessageSentMessageFolder | SentMessageFolderData | Defines a format for representing a link to a folder item corresponding to the message. The folder item can be defined in accordance with a Folder Schema. This field specifies a link to a folder the message can be moved to after being submitted for delivery. |

Depicted in FIG. 2A, schema hierarchy 200 includes content schema 216. Content schema 216 includes interrelated fields 217 that define data formats for representing a portion of content associated with a message item. A message item defined in accordance with message schema 212 can include a link to a portion of content (e.g., a body or attachment) defined in accordance with content schema 216. This can be a link to a document, an event, or some other portion of content. A message item can have multiple bodies and/or attachments. For example, a multipart MIME message can contain multiple bodies. More specifically, interrelated fields 217 can define data formats as described in Table 3.

TABLE 3

| Field Name | Field Data Type | Field Description |
|---|---|---|
| ContentMetadata | ContentProperties | Defines a format for representing content properties of a portion of content (e.g., a message body or attachment). ContentProperty types contain fields that describe the content of a message. It is on a relationship between message and item representing content of on extension for attachment. |

TABLE 3-continued

| Field Name | Field Data Type | Field Description |
|---|---|---|
| IsAttachment | Booelan | Defines a format for indicating whether the portion of content referred to is a body, or attachment for a message. This field represents what the application thinks this content is as opposed to the ContentDisposition field which is a suggestion from MIME. |
| Order | Int32 | Defines a format for representing an order for the portion of content. This value provides an order to the bodies and attachments. User interfaces should take this value into consideration when displaying the order of the attachments to the user. The first body can be the preferred one. |

Depicted in FIG. 2A, schema hierarchy 200 includes attachment schema 218. Content schema 218 includes interrelated fields 219 that define data formats for representing an attachment associated with of a message item. An attachment defines in accordance with attachment schema 218 can include a link to a message item defined in accordance with message schema 212. More specifically, interrelated fields 219 can define data formats as described in Table 4.

TABLE 4

| Field Name | Field Data Type | Field Description |
|---|---|---|
| ContentMetadata | ContentProperties | Defines a format for representing content properties of an attachment. ContentProperty types contain fields that describe the attachment. It is on a relationship between message and item representing content on extension for attachment. |

TABLE 4-continued

| Field Name | Field Data Type | Field Description |
| --- | --- | --- |
| AttachementState | String | Defines a format for indicating the type and behavior of the attachment. Values can include: 1) EnclosedAttachment: This value indicates an attachment that is stored decoded outside of the Mime. The attachment will behave as if it is enclosed within the Mime Stream. This database Item was created because the data is to be stored in decoded form or the properties need to be schematized. The two most common scenarios that require this are: A. Some protocols will download attachments outside of the MIME content in decoded form. B. The attachment data or meta properties need to be accessible, but this attachment may not behave as if the sender attached this document/file for the recipient to use directly. Examples include: Signature blobs, Inline Only Attachments, Digital Signature certs or data. 2) PromotedAttachment: This attachment is promoted to act like a peer of the message. It will appear in the shell along side the message. 3) SavedAsAttachment: This attachment has be 'Saved As', so it will act as a copy of the message. |
| Is Encrypted | Boolean | Defines a format for indicating if the attachment is encrypted. |
| IsPinned | Boolean | Defines a format for indicating if the attachment is pinned, meaning it will continue to exist when the message is deleted. If the attachment is not pinned, the following can happen: 1. When the Message is deleted, the Attachment is deleted. (The destination of the AttachmentInformation.Attachment link.) 2. When the Attachment item is deleted, any information or metadata associated with the Attachment is deleted from the message. (To save space or for privacy) |
| IsRead | Boolean | Defines a format for indicating if a message linked to the attachment has been marked as read by the user. |
| IsSigned | Boolean | Defines a format for indicating if a message linked to the attachment is signed. |
| IsTrusted | Booelan | Defines a format for indicating if a message linked to the attachment has satisfied the user's security preferences to appear along with their other files. If security preferences are satisfied, the attachment has met the user's criteria to not need to display warning user interface. The criteria could be: the attachment content, the sender is approved, or user interface as already been displayed. On the other hand, if security preferences are not satisfied, a security preferences warning user interface should be shown to the user before the attachment is opened. This will inform the user that the content could have came from an untrusted source and may contain harmful contents. |
| LastActionTaken | String | Defines a format for representing the last action taken on a message linked to the attachment. Possible values are: Replied and Forwarded. |
| LastActionTime | DateTime | Defines a format for representing the date and time the last action was taken on a message linked to the attachment. |
| LastActionType | String | Defines a format for representing the type of last action taken on a message linked to the attachment. Should be interpreted together with LastActionTaken. Examples are: Fax or Email to mark that we replied by fax or email. |
| Priority | String | Defines a format for representing priority of a message linked to the attachment. Attachment priority for delivery can be set by application. Possible Values: AboveNormal, Normal, BelowNormal. Higher values indicate that a transport should deliver attachment sooner than items of a lower level. |

TABLE 4-continued

| Field Name | Field Data Type | Field Description |
| --- | --- | --- |
| SendStatus | String | Defines a format for representing the send status of the attachment. For example, a UI can mark the attachment "ToSend" for transports to pick up. A UI can mark the attachment as "Sending" indicating a transition from "ToSend" to "Sending" so other transports won't also attempt to send the message. A UI can mark an attachment as "Sent": The transport transitions from "Sending" to "Sent" after the send is complete. |
| Size | Int64 | Defines a format for representing the size of a message (including attachments) linked to the attachment. |
| Subject | String | Defines a format for representing the subject of a message linked to the attachment. For example, one line that describes attachment. |
| TimeReceived | DateTime | Defies a format for representing the date and time the attachment was delivered. The TimeReceived property describes the time a message linked to the attachment was received by the server, rather than the time the attachment was downloaded from the server and placed in the local database store. This value can be omitted on draft messages and retained copied of send messages. |
| TimeSent | DateTime | Defies a format for representing the date and time a message linked to the attachment was submitted. On draft messages this value can be omitted - it may be set when the message is submitted. |
| Type | String | Defines a format for representing the type of a message linked to the attachment. The attachment type will imply behavior of the linked message. The application can customize icons and read custom headers based on the attachemnt type. This value can come from the X-MessageType header. |
| AttachmentMessage | MessageData | Defines a format for representing a link to a message item associated with the attachment. The message item can be defined in accordance with a message schema. |
| AttachmentParticipants | ParticipantsData | Defines a format for representing a collection of users who participated in this attachment exchange. This includes, senders, receivers, people copied (Cc), etc. |
| AttachmentSavedFrom | SavedFromData | Defines a format for representing a link to allocation the attachment was saved from. Users may use a User Interface to 'Save As' a copy of the attachment. Doing so can make a copy of the attachment. If this value is included, then the attachment is a 'Saved As' copy of an original attachment. The destination of this link is the original attachment. |
| AttachmentSource | AttachmentSourceData | Defines a format for representing the source of the attachment. If the attachment was composed and this link has a value, then the link points to the database item where the attachment came from. |

Depicted in FIG. 2A, schema hierarchy 200 includes content properties schema 224. Content properties schema 224 includes interrelated fields 225 that define data formats for representing content properties. Content properties contain fields that describe the content of a message. Content properties are used on relationships between a message item and a portion of content (e.g., defined in accordance with content schema 216) or on extension for an attachment (e.g., defined in accordance with attachment schema 218). More specifically, interrelated fields 225 can define data formats as described in Table 5.

TABLE 5

| Field Name | Field Data Type | Field Description |
| --- | --- | --- |
| ContentBase | String | Defines a format for representing a content base of the content. ContentID, ContentBase, |

TABLE 5-continued

| Field Name | Field Data Type | Field Description |
| --- | --- | --- |
| | | and ContentLocation allow referencing between MIME sections. This can be used to allow URLs in HTML bodies to reference attached content. |
| ContentDescription | String | Defines a format for representing a description that may accompany the content. For electronic mail messages, this value may have come from the Content-Description: header. Some legacy clients use Content Description for the recommended filename. |
| ContentID | String | Defines a format for representing a content entity ID of the content. Content-ID, Content-Base, and Content-Location allow referencing between MIME sections. This can be used to allow URLs in HTML bodies to reference attached content. |
| ContentType | String | Defines a format for representing a Content-Type of the content. For electronic mail messages, this can match the Content-Type header field for the MIME section where the attachment came from. For other types of electronic messages, this content type can best match the content of the content. For example: The Content-Type could be 'audio/mp3' and the MesaageContent could point to an Item in a Music schema, or to a .mp3 file containing, or to another Item that stores music data. Thus, the Content-Type give a standard indication of the data. This is a free form string. Applications can put their own types here, not just 'text/html' and other mime content types. |
| ContentTypeParameters | String | Defines a format for representing parameters in the Content-Type header. Parameters are of the format 'attribute = value' and can be separated by a ';'. May contain a filename. |
| IsMacBinary | Booelan | Defines a format for indicating whether the attachment is a Mac Binary. Thiscan facilitate special processing for Mac binaries. |
| MimeURL | String | Defines a format for representing a MIME path. A MimePath: URL of the form: MimePath:///[Level1]:[MultiPart-Type]/[Level2]:[MultiPart-Type]/.../[Leveln]:[MultiPart-Type] |
| SuggestedFileName | String | Defines a format for representing the filename that is recommended to go with the cotnent. The path can be omitted and this may just include the filename. For electronic mail messages, this value may have come from the Content-Type: 'name' parameter or the Content-Disposition-Filename or another location in the original email message. For example: 'Bill in Florida 2004.jpg' |

Depicted in FIG. 2B schema hierarchy 200 includes a plurality of message extension schemas including message protocol extension schemas 230 and message application extension schemas 250. Message protocol extension schemas 230 includes a plurality a protocol extension schemas that can be utilized to extend a message item for compatibility with a plurality of corresponding message protocols. For example, message protocol extension schemas 230 includes instant message protocol schema 231, E-mail protocol schema 233, and Fax protocol schema 235, that can promote compatibility with an instant message, electronic mail and fax protocol respectively. The ellipses before, between, and after the schemas expressly depicted in message protocol extension schemas (e.g., for extending message items for compatibility with voices message protocols, Blog entry protocols, ect.).

Vertical ellipses 232 and 236 indicate that instant message protocol schema 231 and fax protocol schema 235 respectively can contain one or more interrelated data fields. The one or more interrelated data fields can be utilized to extend a message item for compatibility with a corresponding message protocol. For example, e-mail protocol schema 233 includes interrelated fields 234 that can be utilized to extend a message item (e.g., defined in accordance with message schema 212) for compatibility with an electronic mail protocol. More specifically, interrelated fields 234 can define data formats as described in Table 6.

TABLE 6

| Field Name | Field Data Type | Field Description |
| --- | --- | --- |
| ConversationIndex | Binary | Defines a format for representing the relative position of this message within a conversation thread. The ConversationIndex can be implemented using concatenated time stamp values. A conversation view is created by grouping the message list by ConversationTopic and sorting within each group by ConversationIndex |
| ConversationTopic | String | Defines a format for representing a conversation thread represents corresponding to series of messages and replies. The ConversationTopic value is set for the first message in a thread, for example, to the NormalizedSubject. Subsequent messages in the thread can use the same ConversationTopic without modification. |
| FlagColor | String | Defines a format for representing the color of a flag. |
| FlagReminderDate | String | Defines a format for representing the date and time the requested action is due. |
| FlagStatus | String | Defines a format for representing whether the message has been flagged by the user. Possible values include None, Marked, and Complete. This categorization may be extended based on application requirements. |
| FlagTitle | String | Defines a format for representing the text of the flag on the message. |
| InternetMessageID | String | Defines a format for representing an Internet message ID of the message. Can correspond with the RFC 2822 "Message-ID:" field in SMTP. The value can be omitted on newly-created and draft messages. |
| MimeStream | Binary | Defines a format for representing the mime encoded content for the message. The MimeContent represents the uninterpreted form of the message content. The message stream can be parsed and stored as fields (Message type, Body, Attachments, etc.). Certain kinds of custom infrequently used information will exist only in the MimeStream, such as: 'X-' headers, some mime section headers, text pre or post boundries, redundant attachment filenames (Content-Type: 'Name', Content-Type-Disposition-Filename, etc.), among others. The original MimeStream can also be used to check of digital signatures or attempting to decode with a different char-set. This field can be of FileStream type. |
| ShowPaperClip | Boolean | Defines a format for indicating if the message contains a significant attachment that warrants showing a paper clip for the message in UI. It can be calculated by a complex application-specific algorithm. For example, it accounts for attachments, but not Inline attachments and signature blobs. |

Depicted in FIG. 2B, e-mail POP3 schema 237 derives from e-mail protocol schema 233 and includes additional interrelated fields 238 that define POP3 specific data. E-mail POP3 schema 237 can be utilized to extend an electronic mail message (e.g., including fields defined in accordance the e-mail protocol schema 233) to promote compatibility with the POP3 protocol. Interrelated fields 238 can define data formats as described in Table 7.

TABLE 7

| Field Name | Field Data Type | Field Description |
| --- | --- | --- |
| Deleted | Boolean | Defines a format for indicating if the message has been deleted on the server. |
| UIDL | String | Defines a format for representing how to synchronize the message. This field is used during synchronization when the feature to 'Leave messages on the server' is enabled. The UIDL is used to uniquely identify POP3 messages during synchronization. |

Depicted in FIG. 2B, e-mail NNTP message schema 239 derives from e-mail protocol schema 233 and includes additional interrelated fields 240 that define NNTP specific data. E-mail NNTP schema 237 can be utilized to extend an electronic mail message (e.g., including fields defined in accordance the e-mail protocol schema 233) to promote compatibility with the NNTP protocol. Interrelated fields 240 can define data formats as described in Table 8.

TABLE 8

| Field Name | Field Data Type | Field Description |
| --- | --- | --- |
| ArticleID | Int32 | Defines a format for representing the article id of the message. The ArticleID used by the NNTP protocol to coordinate messages between the server and the client. |
| IsArticleExpired | Boolean | Defines a format for indicating if the message has been deleted from the server |
| IsKeepBody | Boolean | Defines a format for indicating if the message body is to be saved on cleanup. |
| Lines | Int64 | Defines a format for representing the number of lines in the message. |

Depicted in FIG. 2B, e-mail community news schema 241 further derives from e-mail NNTP schema 239 and includes additional interrelated fields 242 that define community news specific data. E-mail community news schema 241 can be utilized to extend an NNTP message (e.g., including fields defined in accordance the e-mail NNTP schema 239) to promote compatibility with community news messages. Interrelated fields 242 can define data formats as described in Table 9.

Message application extension schemas 250 includes a plurality of application extension schemas that can be utilized to extend a message item for compatibility with a plurality of corresponding message applications. For example, message application protocol extension schemas 250 includes Blog application schema 251, e-mail application schema 253, and second e-mail application schema 255, that can promote compatibility with an blog application, a first electronic mail application, and a second electronic mail application respectively. The ellipses before, between, and after the schemas expressly depicted in message application extension schemas 250 indicates that message application extension schemas 250 can include additional schemas (e.g., for extending message items for compatibility with voice message applications, fax applications, news group applications, etc.).

Vertical ellipses 252 and 256 indicate that blog application schema 251 and second e-mail application schema 255 respectively can contain one or more interrelated data fields. The one or more interrelated data fields can be utilized to extend a message item for compatibility with a corresponding message application. For example, e-mail application schema 253 includes interrelated fields 254 that can be utilized to extend a message item for compatibility with a particular electronic mail application. The particular electronic mail application can be different from a second e-mail application corresponding to second e-mail application schema 255. More specifically, interrelated fields 254 can define data formats as described in Table 10.

TABLE 9

| Field Name | Field Data Type | Field Description |
| --- | --- | --- |
| CommunityStatus | String | Defines a format for representing if a poster has found a post they are completely happy with. Possible values: 1) Not Included: No data available, 2) PosterApproved: The poster has read a post that adequately addresses this question, 3) OtherApproved: Another category of poster has indicated that an answer adequately addresses this question |
| FeedBack | String | Defines a format for representing the type of feedback a user has submitted. Possible Values: 1) Not Included: No data submitted, 2) Answered: This indicates that this answer adequately addresses the question asked, 3) Helpful: This post was helpful, 4) NotHelpful: This post was not helpful. |
| PosterID | String | Defines a format for representing an identifier that uniquely identifies the poster. This field can be omitted if the post has not been authenticated. |
| PosterType | String | Defines a format for representing the type of newsgroup poster. Possible values: 1) Not Included: No type has been specified, 2) MVP: This poster is a MVP |
| PostType | String | Defines a format for representing the type of newsgroup post. Possible values: 1) Not Included: No type has been specified, 2) Question: This post is a question, 3) Suggestion: This post is a suggestion, 4) Comment: This post is a comment on a previous post, 5) Answer: This post is an answer to a previous question. |
| ThreadID | String | Defines a format for representing an identifier uniquely identifying a thread that includes the message. |

TABLE 10

| Field Name | Field Data Type | Field Description |
| --- | --- | --- |
| ForwardTo | String | Defines a format for representing if a message is to be auto forwarded. |
| HasPartialReceiveTime | Boolean | Defines a format indicating if time zone was included in the received time. |
| HighlightColor | String | Defines a format for representing a color used to highlight the message. Allows message to be color highlighted when they match a rule or filter. Possible values: None, Color1, Color2, . . . , or Color16. |
| IMAPUID | Int32 | Defines a format for representing a Unique identifier of the message on the IMAP server |
| IsIMAPDelayedDelete | Boolean | Defines a format for indicating if the message has been marked for IMAP delayed deletion. |
| IsMarkedForDownload | Boolean | Defines a format for indicating if the message has been marked for download. |
| IsNewsGroupMessage | Boolean | Defines a format for indicating if the message is a news group message. |
| IsReceiptProcessed | Boolean | Defines a format for indicating if the receipt has already been processed.. |
| IsReceiptSent | Boolean | Defines a format for indicating if a receipt was sent. |
| IsSavedOffline | Boolean | Defines a format for indicating if the message was saved while in offline mode |
| RecHeader | String | Defines a format for representing the 'X-MSOESRec' header found in the message |
| PartialID | String | Defines a format for representing a partial ID for the message. If included, the value is the 'id' parameter in the Content-Type of a Message/Partial message |
| PartialNumber | Int32 | Defines a format for representing a partial number for the message. If included, the value is the 'number' parameter in the Content-Type of a Message/Partial message |
| PartialTotal | Int32 | Defines a format for representing a partial total for the message. If included, the value is the 'total' parameter in the Content-Type of a Message/Partial message. Possible Values: 0 or not included: The message is not a 'Message/Partial' Content-Type message. −1: The message is a full message and it was generated by successfully joining all parts in a 'Message/Partial' Content-Type message. 1 or more: The message is a 'Message/Partial' Content-Type message. |
| Refs | String | Defines a format for representing the Id of the thread that this message references. Can be used in NNTP and IMAP. |
| UserCodePageOverride | Int32 | Defines a format for representing a code page to convert the message to unicode. The code page value comes from the user choosing to try to decode the message with a different code page than was specified in the message |
| WasDeletedOffline | Booelan | Defines a format for indicating if the message was deleted while in offline mode |
| WatchStatus | String | Defines a format for representing whether the message wants to ignore, watch, or neither for a conversation thread. Possible values: None, Watch, or Ignore |
| XRef | String | Defines a format for representing a value of the XRef header |

Figure 3:
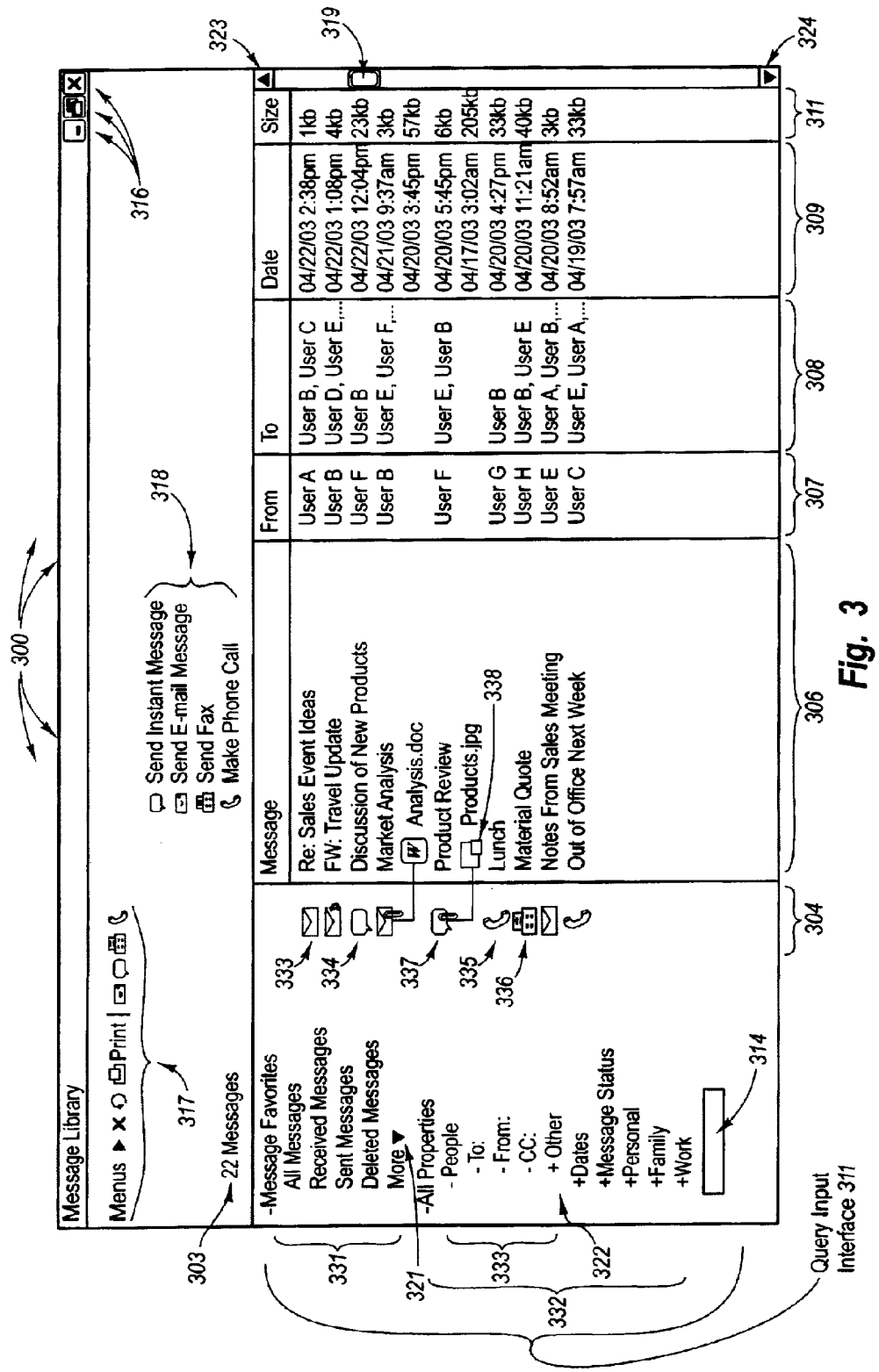
FIG. 3 illustrates a first example display generated by a common messaging interface in accordance with the principles of the present invention.
Figure 4:
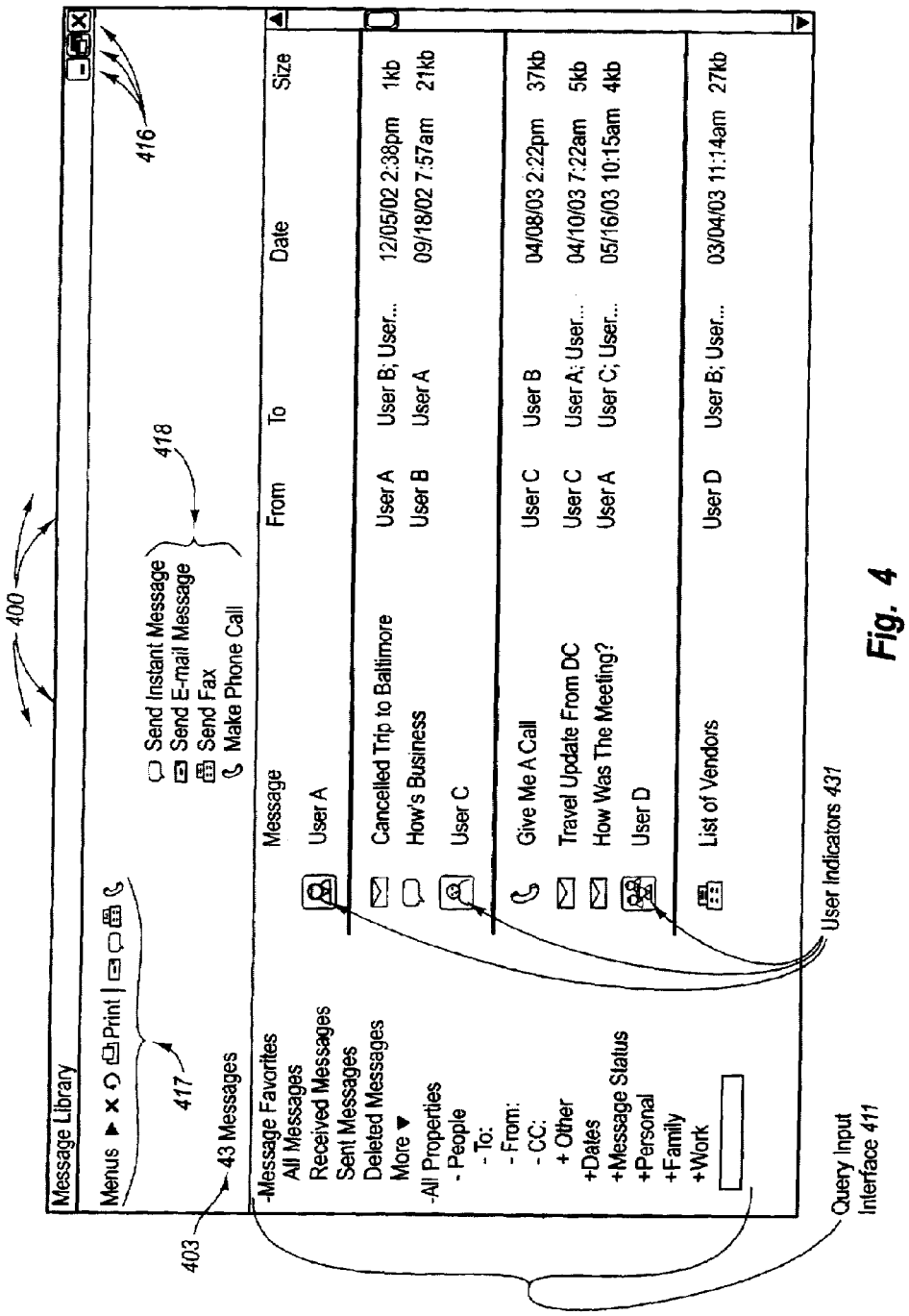
FIG. 4 illustrates a second example display generated by a common messaging interface in accordance with the principles of the present invention.
Figure 5:
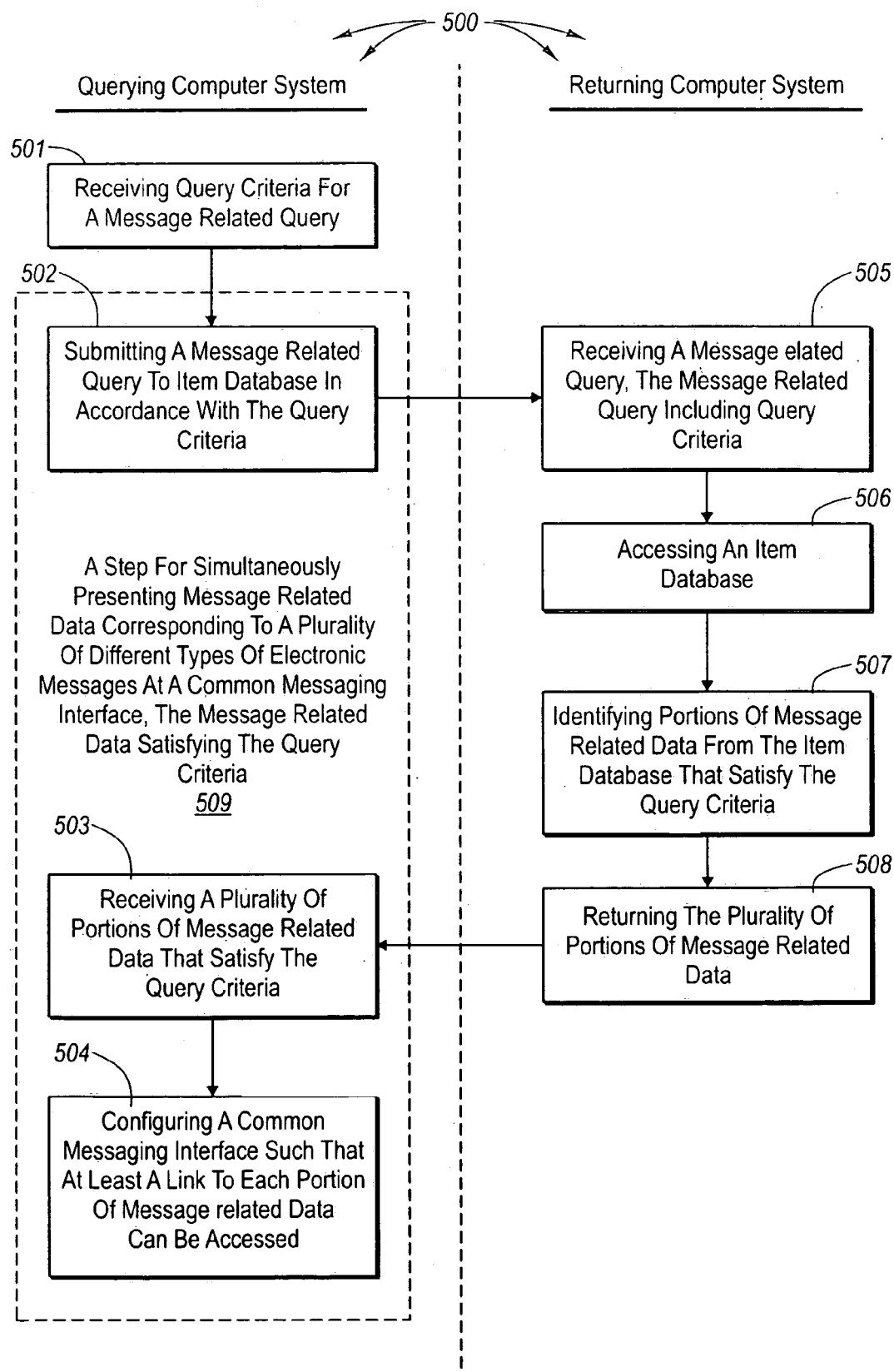
FIG. 5 illustrates an example flowchart of a method for accessing different types of electronic messages through a common messaging interface in accordance with the principles of the present invention.

FIG. 5 illustrates an example flowchart of a method 500 for accessing different types of electronic messages through a common messaging interface in accordance with the principles of the present invention. FIG. 3 illustrates a first example of a display 300 generated by a common messaging interface in accordance with the principles of the present invention. FIG. 4 illustrates a second example of a display 400 generated by a common messaging interface in accordance with the principles of the present invention. The method 500 will be described will be described with respect to network architecture 100, schema hierarchy 150, display 300 and display 400.

The method 500 includes an act of receiving query criteria for a message related query (act 501). Act 501 can include a computer system receiving query criteria for a message related query. For example, common messaging interface 103 can receive query criteria for a message related query. Query criteria can be received from an input device (e.g., a mouse or keyboard) or remotely from another computer system.

Display 300 (e.g., a display generated by common messaging interface 103) depicts query input interface 311 that can receive query criteria used to query for message related data. Query input interface 311 can receive query criteria related to Message Favorites 331, such as, for example, related to all messages, received messages, sent messages, deleted messages, etc. A user can manipulate an input device (e.g., a mouse) to select one or more items in Message Favorites 311. Selecting an item in Message Favorites 311 can cause query input interface 311 to receive query criteria. For example, a user can select "Sent Messages" (e.g., by "clicking" on Sent Messages) to cause query input interface 311 to receive query criteria used to search for sent messages.

A user can manipulate an input device to select down arrow 321, which may reveal additional message favorites. These additional message favorites can be selected to cause query input interface 311 to receive other and/or additional query criteria. Query criteria received as a result of selecting items in Message Favorites 311 can be used to search for message related data values contained in message items. For example, received query criteria can be used to search for message items have data fields defined in accordance with schema hierarchy 150 (or schema hierarchy 200) and/or stored in message silo 184.

Query input interface 311 can also receive query criteria related to All Properties 332, such as, for example, related to message participants, message dates, message status, personal messages, family messages, work messages, etc. A user can manipulate an input device to select one or more items corresponding to All Properties 332. For example, a user can select "Work" to cause query input interface 311 to receive query criteria used to search for work related messages.

All Properties 332 may be arranged as a hierarchical tree of properties. A user can manipulate an input device to reveal or hide lower level properties. It may be that a user selects a "+" associated with a higher level property to reveal corresponding lower level properties. For example, a user can select + 322 to reveal lower level selectable Date properties (e.g., sent dates and received dates). On the other hand, a user may select a "−" associated with a higher level property to hide corresponding lower level properties. Lower level properties 333 are an example of the results of selecting a + associated with the People property. As depicted, the lower level properties, "To", "From", "CC", etc., are revealed. Lower level properties depicted in lower level properties 333 can include additional lower level properties. For example, selecting the + associated with the "Other" lower level property (in lower level properties 333) may reveal lower level properties below the Other lower level property.

A user can manipulate an input device to select properties of different levels from All Properties 332. Properties can be selected to cause query input interface 311 to receive other and/or additional query criteria. Query criteria received as a result of selecting items in All Properties 311 can be used to search for message related data values contained in message items. For example, received query criteria can be used to search for message items have data fields defined in accordance with schema hierarchy 150 (or schema hierarchy 200) and/or stored in message silo 184.

Input field 314 can receive query criteria for querying for keywords included in messages. A user can manipulate an input device (e.g., a keyboard) to enter text into input field 314. Query criteria received as a result of entering text into input field 314 can be used to search for message related data values contained in message items. For example, received query criteria can be used to search for message items have data fields defined in accordance with schema hierarchy 150 (or schema hierarchy 200) and/or stored in message silo 184.

It should be understood that combined query criteria, including query criteria associated with Message Favorites 331 and/or query criteria associated with All Properties 332 and/or query criteria entered at input field 314, can be received. Combined query criteria can result when a plurality of items is selected from Message Favorites 331 or All Properties 332. Combined query criteria can also result when one or more items from Message Favorites 331 are combined with one or more items from All Properties 332. Further, combined query criteria can results when one or more items from Message Favorites 331 or one or more items from All Properties 332 are combined with text entered at input field 314.

Thus, query criteria can be more coarse resulting in broader queries and more results. For example, query criteria indicating all Sent Messages (entered by selecting "Sent Messages" from Message Favorites 331) from a specified user (entered by selecting "From" from All Properties 332) may result in an increased number of results. On the other hand, query criteria can be more granular resulting in narrower queries and fewer results. For example, a query criteria indicating all received family related messages (entered by selecting "Received Messages" from Message Favorites 311 and selecting "Family" from All Properties 332) including the keyword "fireworks" (entered at input field 314) may mu result in fewer results. Accordingly, query criteria can be flexibly received to meet the needs of a user.

Query input interface 311 expressly depicts controls for receiving some of the different types of query criteria that can be used to search for message related data. However, it should be understood that a query input interface can receive query criteria (including other types of query criteria in addition to those that can be received at query input interface 311) for searching for virtually any value from any message item data field, including searching for values from message item data fields defined in accordance with a schema hierarchy. For example, a query input interface can receive query criteria for searching values of any message item data fields defined (e.g., a participants field, subject field, etc.) in accordance with schema hierarchy 150 or schema hierarchy 200.

The link from message schema 152 to folder 154 indicates that messages items defined in accordance with message schema 152 can be linked to a folder items defined in accordance with folder schema 154. When a message item is linked to a folder item, the message item can be viewed as being "in" the folder item (and thus the folder item is message related data). A message item may include links to a plurality folder items. Thus, a message item may be viewed as being in a plurality of folders. Accordingly, a query input interface can be configured to receive appropriate query criteria for a message related query that will search (or that "spans") a plurality of folders.

The link from attachment schema 157 to message schema 152 indicates that attachments defined in accordance with attachment schema 157 can be linked to message items defined in accordance with message schema 152. When an attachment is linked to a message item, the attachment can be viewed as being in the message item (and thus the attachment is message related data). A message item can include a plurality of attachments. Thus, a message item can be viewed as including a plurality of attachments. Attachments can be documents that are stored in document silo 186. Accordingly, a query input interface can be configured to receive appropriate query criteria for a message related query that will search for documents.

The link from message schema 152 to contact schema 153 indicates that messages items defined in accordance with message schema 152 can be linked to a contact items defined in accordance with contacts schema 153. When a message item is linked to a contact item, the entity corresponding to the contact item can be viewed as a participant of the message item. A message item may include links to a plurality contact items. Thus, a message item may be viewed as having a plurality of participants. Accordingly, a query input interface can be configured to receive appropriate query criteria for a message related query that will search for participants.

Received query criteria can be used to search data fields of message items having any primary message type (e.g., as defined in the PrimaryType field of Table 2). For example, received query criteria can be used to search electronic mail messages, instant messages, voice mail messages, fax messages, news group postings, blog entries, etc.

The method 500 includes functional result-orient step for simultaneously presenting message related data corresponding to different types of electronic messages at a common messaging interface (step 509). Step 509 can include any corresponding acts for accomplishing the result of simultaneously presenting message related data corresponding to different types of electronic messages at a common messaging interface. However, in the example method of FIG. 5, step 509 includes a corresponding act of submitting a message related query in accordance with the received query criteria (act 502).

Act 502 can include a querying computer system submitting a message related query in accordance with the received query criteria. For example, computer system 102 can submit query 107, which includes query criteria 117, to computer system 109. Query criteria 117 can be query criteria received at common messaging interface 102 (e.g., as a result of selections made at a query input interface similar to query input interface 311).

A submitted message related query can be a query for values of message item data fields (e.g., participants, subject, etc.). For example, a message related query can query for message item data fields of message items stored in message silo 184 and/or defined in accordance with schema hierarchy 150 (or schema hierarchy 200). A submitted message related query can span a plurality of folders. For example, a submitted query can query for values of message item data fields in a plurality of folder items stored in folders silo 183. A submitted message related query can query for documents associated with a message item. For example, a submitted message related query can query for values of docuemnt item data fields in document silo 186. A submitted message related query can query for participants associated with a message item. For example, a submitted message related query can query for values of contact item data fields in contact silo 182. A message related query can query values of data ield items that are common to a plurality of different types of electronic messages, such as, for example, electronic mail messages, instant messages, voice mail messages, fax messages, news group postings, and blog entries.

The method 500 includes an act of receiving a message related query including query criteria (act 505). Act 505 can include a returning computer system receiving a message related query including query criteria. For example, computer system 109 can receive query 107, which includes query criteria 117, from computer system 102. Accordingly, computer system 109 can receive query criteria for a query that queries message item fields, spans folders, queries for participants, or queries for documents. A received message related query can query values of data fields that are common to a plurality of different types of electronic messages, such as, for example, common to electronic mail messages, instant messages, voice mail messages, fax messages, news group postings, and blog entries.

The method 500 includes an act of accessing an item database (act 506). Act 506 can include a returning computer system accessing an item database. For example, computer system 109 can access database 114. When appropriate, message application 111 can convert query 107 into database access command 112. Computer system 109 can then submit database access command 112 to database 114. Database access command 112 can include appropriate database instructions for implemnting query 107.

The method 500 includes act of identifying portions of message related data from the item database that satisfy the query criteria (act 507). Act 507 can include a computer system identifying portions of message related data form the item database that satisfy the query criteria. For example, computer system 109 can identify message related data 108. Database 114 can send message related data 108 to computer system 109 in response to database access command 112. Message related data 108 can include one or more portions of message related data that satisfy query criteria (e.g., query criteria 117).

Identified message related data can include data from any of the silos of database 114. For example, message participant data can be returned from contacts silo 182, message folder data can be returned form folder silo 183, message data can be returned from message silo 184, and message attachment data can be returned from document silo 186.

It may be that message silo 184 stores a plurality of message items that each have a different message types (as indicated by a primary type value). For example, message silo 184 can store electronic mail messages, instant messages, voice mail messages, fax messages, news group postings, blog entries, etc. Message items in message silo 184 can be defined in accordance with message schema 152 (or message schema 212). Accordingly, message items, even message items of different types, can include a plurality of common data fields.

It should be understand that message items extended in accordance message protocol extension schemas 161 and/or message application extension schemas 166 can nonetheless retain fields defined in accordance with message schema 152 or 212. Thus, message items that are extended for compatibility with specific message protocols and/or message applications can still be queried for values of commonly defined fields. For example, since all messages in message store 184 can be defined in accordance with message schema 152 or 212, message items of any type or having any extension can be queried for a particular value in a message subject field (or, for example, can be queried for values in any other fields defined in accordance with message schema 152 or 212).

Thus, message related data 108 can include message items representing a plurality of different types of electronic messages. That is, a plurality of different types of electronic messages may have values that satisfy received query criteria. For example, a fax message and news group posting may both have a subject field value and/or importance field value (and/or other field values defined in accordance with message schema 152 or 212) that satisfy received query criteria (e.g., query criteria 117).

The method 500 includes an act of returning the plurality of portions of message related data (act 508). Act 508 can include a computer system returning the identified portions of message related data. For example, computer system 109 can return message related data 108 to computer system 102. It may be that message application 111 appropriately formats message related data 108 before message related data 108 is returned to computer system 102.

The step 509 includes a corresponding act of receiving a plurality of portions of message related data that satisfy the query criteria (act 503). Act 503 can include a computer system receiving portions of message related data that satisfy the query criteria. For example, computer system 102 can receive message related data 108 (that satisfies query criteria 117) from computer system 109.

Received message related data can include portions of message related data that have one or more data fields defined in accordance with different extension schemas. For example, one portion of message related data can include data fields defined in accordance with schema 162, while another different portion of message related data includes data fields defined in accordance with schema 163. Both portions may be data fields defined in accordance with message schema 152 or 212.

The step 509 includes configuring a common messaging interface such that at least a link to each portion of received message related data can be accessed (act 509). Act 509 can include a computer system configuring a common messaging interface such that at least a link to each portion of received message related data can be accessed. For example, computer system 102 can configure common messaging interface 103 such that at least a link to each portion of message related content 108 can be accessed.

Referring back to FIG. 3, display 300 depicts one example of displaying links to portions of message related data. Depicted in display 300 are message type column 304, subject column 306, from column 307, to column 308, data column 309, and size column 311. Message type column 304 displays an indication of a type of message related data. Different icons can be displayed to represent different types of message related data. For example, envelope icon 333 can represent electronic mail messages, text bubble icon 334 can represent instant messages, telephone icon 335 can represent voice mail messages, and fax machine icon 336 can represent fax messages. Other types of icons can also be displayed to represent other types of messages, such as, for example, news group postings, blog entries, etc.

A paperclip icon attached to an icon representing a message indicates that an attachment is associated with the represented message. For example, text bubble icon and attached paperclip icon 337 represent an instant message that is associated with attachment. Icon 338 represents that the attachment is a picture document.

A user can select an icon representing an electronic message to view the content of the electronic message. For example, a user can select envelope icon 333 to view the contents of the represented electronic mail message. Thus, envelope icon 333 essentially functions as a link to the contents of the represented electronic mail message. Selecting envelope icon 333 can cause an additional query (for the contents of the electronic message represented by envelope icon 333) to be submitted to database 114. Portions of message related data received in response the-additional query can be displayed at display 300. Alternately, an appropriate messaging application can be initiated in response to a received portion of message related data. For example, when a portion of message related data is defined in accordance with a schema extension (e.g., an e-mail application schema), an application corresponding to the schema extension (e.g., an e-mail application) can be initiated to view the portion of message related data.

Similarly, a user can select a message participant (a link to participant content) to view the content of a contact item. For example, a user could click on "User G" to reveal contact information (e.g., stored in contacts silo 182) corresponding to User G. Likewise, a user can select an attachment icon (a link to an attachment) to view the contents of an attachment. For example, a user can select icon 338 to view the document "Prodcuts.jpg" (e.g., stored in document silo 186). Participant and document content can be displayed at display 300. Alternately, an appropriate application can be initiated to display the participant or document content.

Subject column 306 indicates the subject of message related data corresponding to an icon in message type column 304. From column 307 indicates an entity that sent the message related data corresponding to an icon in message type column 304. To column 308 represents the recipients of the message related data corresponding to an icon in message type column 304. Data column 309 represents the date the message related content corresponding to an icon in message type column 304 was sent. Size column 311 represents the size of the message related content corresponding to an icon in message type column 304.

It may be that all received portions message related content cannot be displayed simultaneously. A user can manipulate slider control 319 to scroll up and/or down to reveal additional portions of message related content. A user can also select up arrow 323 to scroll up and down arrow 324 to scroll down. Boxes from among boxes 316 can be selected to minimize, maximize, re-size, or close display 300. Message indicator 303 indicates the number or portions of message related data received in response to query.

Message menu 317 indicates message operations that can be initiated through display 300. For example, a user can close, forward, or print currently selected electronic message. A use can also select an appropriate icon from message menu 317 to initiate an electronic mail message, an instant message, a fax message, or a phone call. Message list 318 indicates message types that can be used to respond to a displayed message. A user can select an appropriate icon to respond to a displayed message with a specified type of message. For example, a user could select the fax icon from message list 318 to respond to a voice mail message (e.g., represented by telephone icon 335) with a fax message.

A generic form can be used to, enter appropriate data for responding to a message. Message properties specific to a particular type of message can be mapped to the generic form. Accordingly, the generic form can span message types. For example, the "TO:" field of an electronic mail message and the "Originator" field of an instant message can be mapped to a similar (or even the same) input field of the generic form. The generic form can be presented at a common messaging interface (e.g., common messaging interface 103) in response to the selection of an icon from message list 318.

Turning now to FIG. 4, display 400 illustrates a second example of a display 400 generated by a common messaging interface in accordance with the principles of the present invention. Display 400 has the same general features as display 300. That is, query input interface 411 can receive query criteria, message indicator 403 indicates the number of message returned in response to a query, message menu 417 indicates message operations that can be initiated through display 400, message list 418 indicates message types that can be used to respond to a displayed message, and boxes from among boxes 416 can be selected to minimize, maximize, re-size, or close display 400.

Display 400 further represents a view of a "clients" folder (potentially stored in folder silo 183) with messages grouped by client. User icons 431 represent different clients. Below each client are messages in which the client is a participant. For example, User A has participated in an instant message with the subject "How's Business". A user can alter configuration settings of a common messaging interface (e.g., common messaging interface 103) to cause message to be displayed according to participants associated with a folder.

Figure 6:
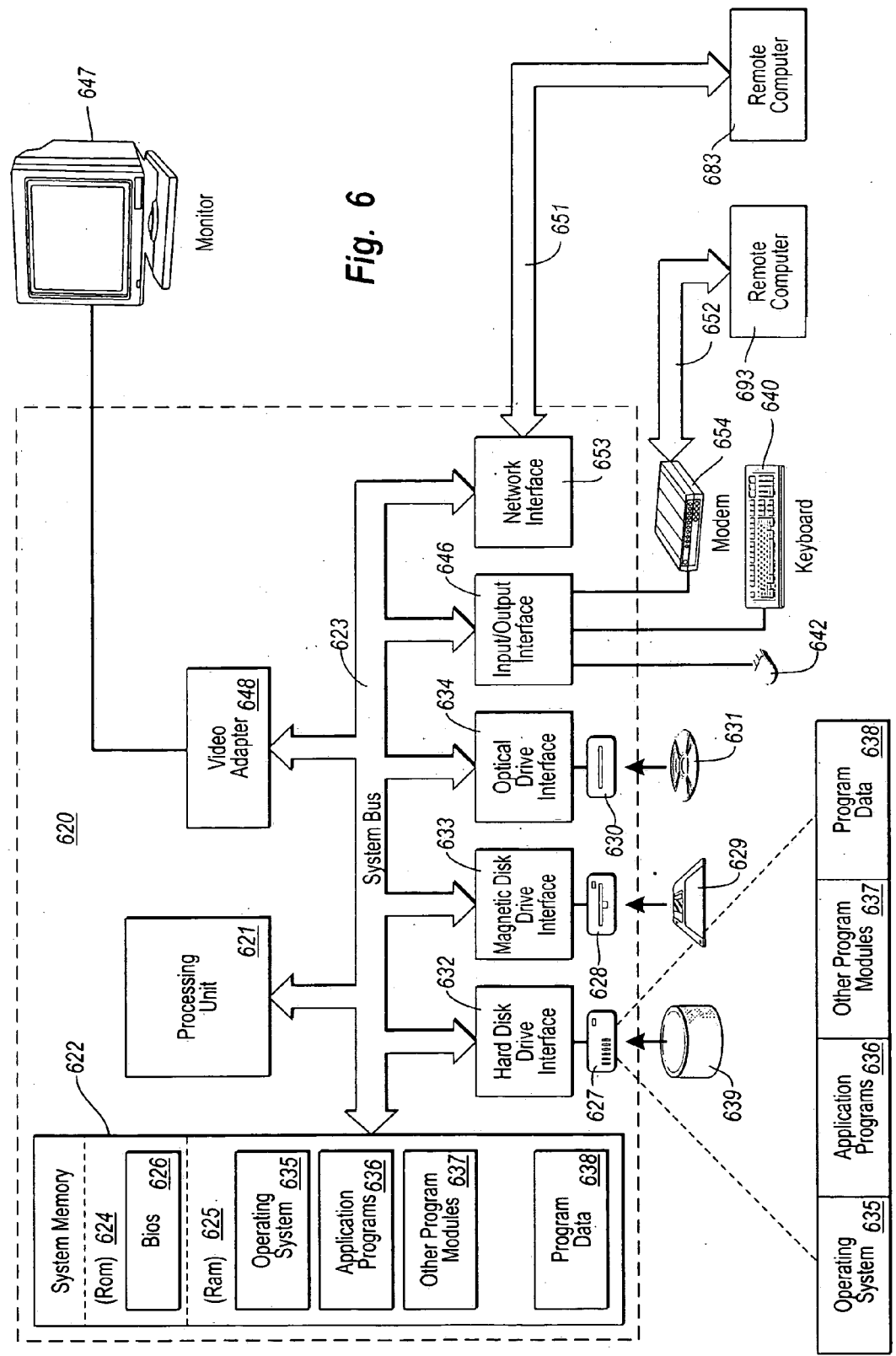
FIG. 6 illustrates a suitable operating environment for the principles of the present invention.

FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide nonvolatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to, the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Speakers 669 or other audio output device is also connected to system bus 623 via audio interface 649. Other peripheral output devices (not shown), such as, for example, printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 1, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 659, through which computer system 620 receives data from and/or transmits data to external sources. As depicted in FIG. 1, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, message applications and common messaging interfaces as well as associated data, including schemas, message items, and message silos may be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a computer system that is network connectable along with one or more other computer systems to a network, a method presenting message related data at a common messaging interface such that the presented message related data can be accessed more efficiently, the method comprising:

an act of receiving query criteria for a message related query, the query criteria being received at the common messaging interface;

an act of submitting a message related query to an item database in accordance with the query criteria;

an act of receiving a plurality of portions of message related data that satisfy the query criteria, the plurality of portions of message related data including at least a first portion of message related data and including at least a second portion of message related, the first portion of message related data having one or more property fields that are defined in accordance with a first message extension schema differently from one or more property fields of the second portion of message related data that are defined in accordance with a second message extension schema ,the first portion of message related data and the second portion of message related data also having one or more common property fields defined in accordance with a message schema; and an act of displaying at least a link to each of the received portions of message related data at the common messaging interface such that different portions of message related data that have one or more differently defined property fields are displayed together.

2. The method as recited in claim 1, wherein the act of receiving query criteria for a message related query comprises an act of receiving query criteria for a message related query that is to span across a plurality of folders.

3. The method as recited in claim 1, wherein the act of receiving query criteria for a message related query comprises an act of receiving query criteria for querying for message related data associated with a specified document.

4. The method as recited in claim 1, wherein the act of receiving query criteria for a message related query comprises an act of receiving query criteria for querying for message related data associated with a specified participant.

5. The method as recited in claim 1, wherein the act of receiving query criteria for a message related query comprises an act of receiving query criteria for querying for message related data associated with a specified subject.

6. The method as recited in claim 1, wherein the act of receiving query criteria for a message related query comprises an act of receiving query criteria for querying for message related data contained in one or more property fields of electronic messages.

7. The method as recited in claim 6, wherein the act of receiving query criteria for querying for message related data contained in one or more property fields of electronic messages comprises an act of receiving query criteria for querying for message related data contained in one or more common property fields that are common to a plurality of different types of electronic messages, the one or more common property fields being defined in accordance with a message schema.

8. The method as recited in claim 7, wherein the act of receiving query criteria for querying for message related data contained in one or more common property fields that are common to a plurality of different types of electronic messages comprises an act of receiving query criteria for querying for message related data contained in one or more common property fields that are common at least to electronic mail messages, instant messages, voice mail messages, fax messages, news group postings, and blog entries stored in the item database.

9. The method as recited in claim 1, wherein the act of receiving query criteria for a message related query comprises an act of receiving query criteria as a result of a user-selection of a link that represents one or more property fields of electronic messages.

10. The method as recited in claim 1, wherein the act of submitting a message related query to an item database comprises an act of submitting a message related query for message related data that spans across a plurality of folders.

11. The method as recited in claim 1, wherein the act of submitting a message related query to an item database comprises an act of submitting a message related query for message related data associated with a specified document.

12. The method as recited in claim 1, wherein the act of submitting a message related query to an item database comprises an act of submitting a message related query for message related data associated with a specified participant.

13. The method as recited in claim 1, wherein the act of submitting a message related query to an item database comprises an act of submitting a message related query for message related data associated with a specified subject.

14. The method as recited in claim 1, wherein the act of submitting a message related query to an item database comprises an act of submitting a message related query for message related data contained in one or more property fields of electronic messages.

15. The method as recited in claim 14, wherein the act of submitting a message related query for message related data contained in one or more property fields of electronic messages comprises an act of submitting a message related query for message related data contained in one or more common property fields that are common to a plurality of different types of electronic messages, the one or more common property fields being defined in accordance with a message schema.

16. The method as recited in claim 15, wherein the act of submitting a message related query for message related data contained in one or more common property fields that are common to a plurality of different types of electronic messages comprises an act of submitting a query for message related data contained in one or more common property fields that are common at least to electronic mail messages, instant messages, voice mail messages, fax messages, news group postings, and blog entries stored in the item database.

17. The method as recited in claim 1, wherein the act of displaying at least a link to each of the received portions of message related data at the common messaging interface comprises an act of displaying message related data associated with different accounts corresponding to the same participant under the same heading at the common messaging interface.

18. The method as recited in claim 1, wherein the act of displaying at least a link to each of the received portions of message related data at the common messaging interface comprises an act of displaying a portion of message related data in a plurality of different groups.

19. The method as recited in claim 1, wherein the act of displaying at least a link to each of the received portions of message related data at the common messaging interface comprises an act of aggregating common but discrete properties of one or more portions of message content so as to present a unified view of the common but discrete properties at the common messaging interface.

20. The method as recited in claim 19, wherein the act of aggregating common but discrete properties of one or more portions of message related content so as to present a unified view of the common but discrete properties at the common messaging interface comprises an act of aggregating the To, From, CC and BCC properties of portions of electronic message related data, along with participant properties of portions of instant message related data, along with callers properties of portions of voice message related data, along with author properties of fax message related data, for display in a participants column at the common messaging interface.

21. The method as recited in claim 1, further comprising:
an act of presenting an interface that facilitates responding to a portion of electronic message data via a mechanism other than the mechanism used to generate the portion of electronic message data.

22. The method as recited in claim 21, wherein the act of presenting an interface that facilitates responding to a portion of electronic message data via a mechanism other than the mechanism used to generate the portion of electronic message data comprises an act of presenting an interface that facilities responding to an electronic mail message using one or more of an instant message, a fax message, a voice message, and a news group posting.

23. In a computer system that is network connectable along with one or more other computer systems to a network, a method for returning message related data that is to be presented at a common messaging interface such that the presented message related data can be accessed more efficiently, the method comprising:
an act of receiving a message related query from a querying computer system, the message related query including query criteria;
an act of accessing an item database, the item database storing a plurality of portions of message related data, the plurality of portions of message related data including at least a first portion of message related data and including at least a second portion of message related, the first portion of message related data having one or more property fields that are defined differently from one or more property fields of the second portion of message related data, the first portion of message related data and the second portion of message related data also having one or more common property fields defined in accordance with a message schema; and
an act of identifying a plurality of portions of message related data contained in the message database that satisfy the query criteria of the message related query, at least one identified portion of message related data having one or more property fields that are defined in accordance with a first message extension schema differently from at least one other identified portion of message related data defined in accordance with another different message extension schema;
an act of returning the plurality of portions of message related data to the querying computer system.

24. The method as recited in claim 23, wherein the act of receiving a message related query from a querying computer system comprises an act of receiving a message related query for message related data that spans across a plurality of folders.

25. The method as recited in claim 23, wherein the act of receiving a message related query from a querying computer system comprises an act of receiving a message related query for message related data associated with a specified document.

26. The method as recited in claim 23, wherein the act of receiving a message related query from a querying computer system comprises an act of receiving a message related query for message related data associated with a specified participant.

27. The method as recited in claim 23, wherein the act of receiving a message related query from a querying computer system comprises an act of receiving a message related query for message related data associated with a specified subject.

28. The method as recited in claim 23, wherein the act of receiving a message related query from a querying computer system comprises an act of receiving a message related query for message related data contained in one or more property fields of electronic messages.

29. The method as recited in claim 28, wherein the act of receiving a message related query for message related data contained in one or more property fields of electronic messages comprises an act of receiving a message related query for message related data contained in one or more common property fields that are common to a plurality of different types of electronic messages, the one or more common property fields being defined in accordance with a message schema.

30. The method as recited in claim 29, wherein the act of receiving a message related query for message related data contained in one or more common property fields that are common to a plurality of different types of electronic messages comprises an act of receiving a query for message related data contained in one or more common property fields that are common at least to electronic mail messages, instant messages, voice mail messages, fax messages, and news group postings stored in the item database.

31. A computer program product for use in a computer system that is network connectable along with one or more other computer systems to a network, the computer program product for implementing a method presenting message related data at a common messaging interface such that the presented message related data can be accessed more efficiently, the computer program product comprising one or more computer-readable media having stored thereon computer executable instructions that, when executed by a processor, cause the computer system to perform the following:

receive query criteria for a message related query, the query criteria being received at the common messaging interface;

submit a message related query to an item database in accordance with the query criteria;

receive a plurality of portions of message related data that satisfy the query criteria, the plurality of portions of message related data including at least a first portion of message related data and including at least a second portion of message related, the first portion of message related data having one or more property fields that are defined in accordance with a first message extension schema differently from one or more property fields of the second portion of message related data that are defined in accordance with a second message extension schema, the first portion of message related data and the second portion of message related data also having one or more common property fields defined in accordance with a message schema; and display at least a link to each of the received portions of message related data at the common messaging interface such that different portions of message related data that have one or more differently defined property fields are displayed together.

32. A computer program product for use in a computer system that is network connectable along with one or more other computer systems to a network, the computer program product for implementing a method for returning message related data that is to be presented at a common messaging interface such that the presented message related data can be accessed more efficiently, the computer program product comprising one or more computer-readable media having stored thereon computer executable instructions that, when executed by a processor, cause the computer system to perform the following:

receive a message related query from a querying computer system, the message related query including query criteria;

access an item database, the item database storing a plurality of portions of message related data, the plurality of portions of message related data including at least a first portion of message related data and including at least a second portion of message related, the first portion of message related data having one or more property fields that are defined differently from one or more property fields of the second portion of message related data, the first portion of message related data and the second portion of message related data also having one or more common property fields defined in accordance with a message schema;

identify a plurality of portions of message related data contained in the message database that satisfy the query criteria of the message related query, at least one identified portion of message related data having one or more property fields that are defined in accordance with a first message extension schema differently from at least one other identified portion of message related data defined in accordance with another different message extension schema; and return the plurality of portions of message related data to the querying computer system.

* * * * *